J. G. MILLER.
HORSE DETACHER.
APPLICATION FILED MAR. 31, 1908.
922,797.
Patented May 25, 1909.
2 SHEETS—SHEET 1.
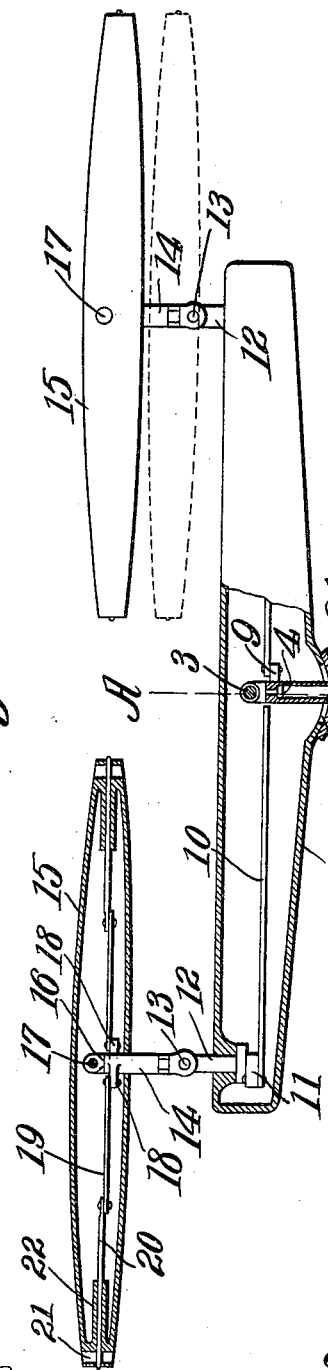
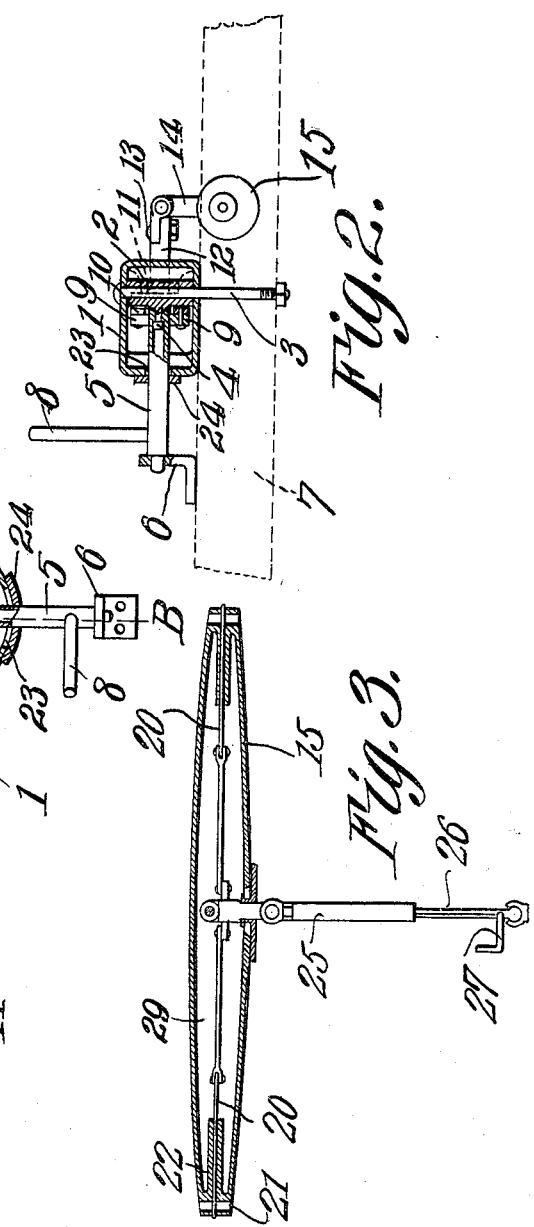
Witnesses
E. W. Stewart
Herbert D. Lawson
Inventor,
John G. Miller.
By C. A. Snow & Co.
Attorneys

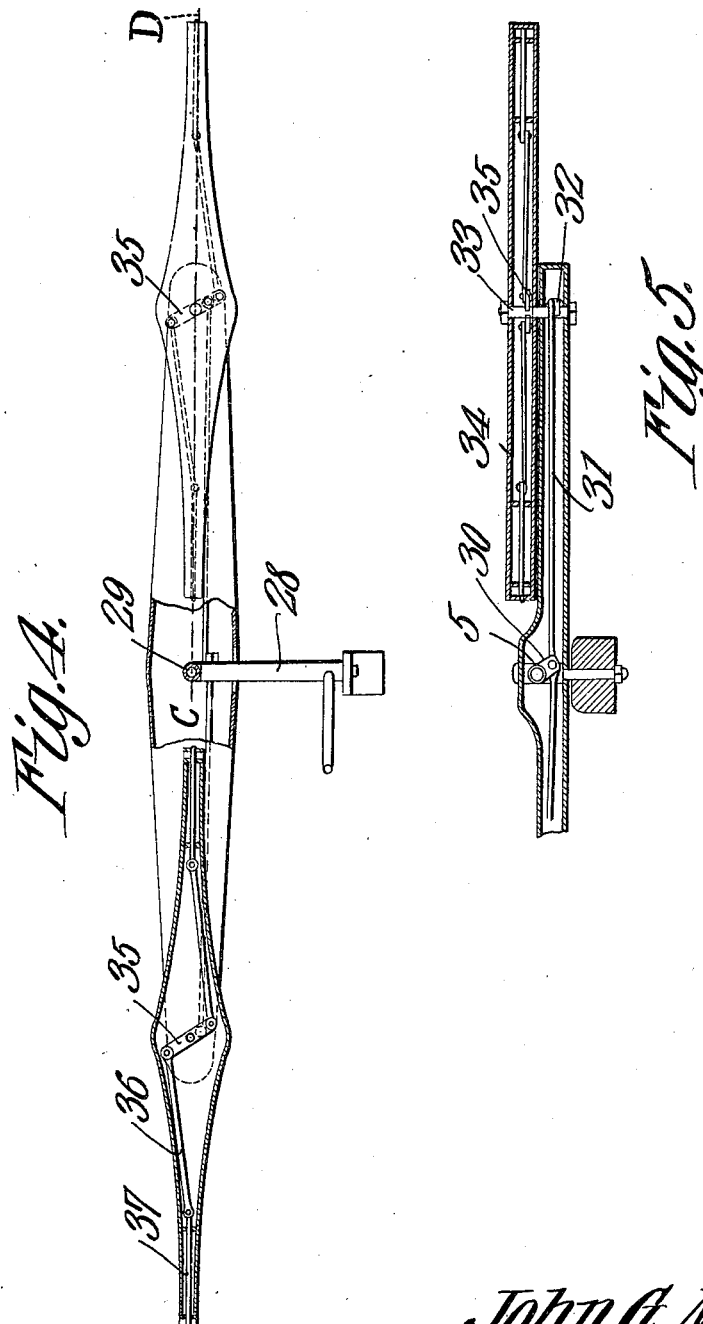

UNITED STATES PATENT OFFICE.

JOHN G. MILLER, OF BURLINGTON, IOWA.

HORSE-DETACHER.

No. 922,797.   Specification of Letters Patent.   Patented May 25, 1909.

Application filed March 31, 1908. Serial No. 424,378.

*To all whom it may concern:*

Be it known that I, JOHN G. MILLER, a citizen of the United States, residing at Burlington, in the county of Des Moines and State of Iowa, have invented a new and useful Horse-Detacher, of which the following is a specification.

This invention relates to that class of devices known as horse detachers for use in quickly disconnecting horses from the trees of a vehicle, such mechanism being particularly advantageous in the event of a runaway.

The principal object of the invention is to provide mechanism practically entirely concealed within the trees for engaging the traces of a harness, said engaging means being readily shiftable either into or out of engagement with the traces by means of a lever located close to the vehicle body.

Another object is to provide mechanism of this character whereby two or more horses can be instantaneously released from the respective swingletrees to which they are harnessed, said mechanism being operated by means of a single lever.

A further object is to provide mechanism of this character which will not interfere with the swinging movement of the trees.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a view partly in plan and partly in section and showing the mechanism applied to a double tree. Fig. 2 is a section on line A—B, Fig. 1, the swingletree being shown hanging down in normal position. Fig. 3 is a section through a swingletree provided with detaching mechanism. Fig. 4 is a view partly in plan and partly in section of a doubletree of a modified form. Fig. 5 is a section on line C—D, Fig. 4.

Referring to the figures by characters of reference, 1 designates a doubletree preferably hollow and formed of metal or other suitable material. A sleeve 2 is mounted upon the pivot bolt 3 of the doubletree and has a head 4 extending radially therefrom and swiveled within a rock bar 5 journaled in one or more brackets 6 secured to a vehicle tongue 7. A lever 8 extends radially from this rock bar and is designed to be positioned close to the vehicle body so as to be conveniently reached by an occupant of the vehicle.

The end of the bar 5 located within the doubletree is provided with oppositely extending arms 9. Each of these arms has a rod 10 pivoted to it and extending toward one end of the doubletree where it is pivoted to a crank arm 11 at the inner end of a rock bar 12. These rock bars are journaled within the front portion of the doubletree adjacent its ends and each bar is connected by means of a plurality of pivots 13 with a bar 14 extending into a swingletree 15 which is also hollow. That end of the bar 14 within the swingletree is swiveled upon a sleeve 16 extending around the pivot pin 17 of the swingletree, the swiveled connection being similar to that shown in Fig. 2. Arms 18 extend in opposite directions from the bar 14 and within the swingletree and each of these arms is provided with a rod 19 pivoted to it and to a bolt 20 slidably mounted within one end of the swingletree. Each end of the swingletree has an opening 21 extending through it to receive a trace and when the bolts are projected to their greatest extent they extend entirely across these openings so as to project through the traces and secure them to the swingletree. As shown in Fig. 1 tubular guides 22 are preferably formed in the end portions of the swingletrees and the bolts are mounted to reciprocate within them. The pivots 13 are so positioned relatively to each other as to substantially constitute a universal joint. It is to be understood, however, that if preferred any form of universal joint may be substituted in lieu of these pivots.

When it is desired to attach traces to the swingletrees 15 the lever 8 is swung in one direction and will cause rock bar 5 to actuate the cranks 11 through rods 10. The bars 12 and 14 will be partly rotated so as to project the bolts 20 partly into the openings 21. Traces are then placed on the ends of the bolts, after which the movement of lever 8 is continued so as to project the bolts entirely across the openings 21. It will be seen that the joints 13 permit the swingletrees to swing relatively to the doubletree and if swinging movement of the doubletree is desired a slot 23 can be formed in the rear face of the doubletree and bar 5 extended through it. A plate 24 can be mounted on the bar 5 so as to keep the slot 23 closed during the rocking movement of the swingletree. This arrangement of the parts can be greatly improved by providing an arcuate plate 24 concentric with the pivot bolt 3 and correspondingly shaping the adjoining face of the doubletree.

Where a swingletree only is utilized that portion of the mechanism contained within the doubletree is dispensed with and instead of the bar 12 hereinbefore described a tubular bar 25 is utilized, the same having an angular bar 26 telescoping thereinto and connected in any suitable manner to the vehicle body, there being a lever 27 extending from the bar 26 and designed to be grasped by the operator for the purpose of partly rotating the bars to actuate the bolts. By providing these telescopic and pivotal connections the usual oscillating movement of the swingletree and swinging movement of the thills is not interfered with.

In some forms of doubletrees the swingletrees are mounted on top of the doubletrees instead of in front of them. Such a construction has been shown in Fig. 4. Where the trees are assembled in this manner it is necessary to slightly modify the mechanism used therein. By referring to Fig. 4 it will be seen that a rock bar 28 similar to the bar 5 is employed and the same is provided adjacent its point of connection with the pivot bolt 29 with an arm 30 from which extends oppositely projecting rods 31. Each rod is pivotally connected to an arm 32 outstanding from a bolt 33 on which a swingletree 34 is pivoted. This bolt is mounted to merely turn within the swingle and double trees and has oppositely extending arms 35 each of which is connected by means of rods 36 with slidable bolts 37. It will be seen therefore that when rock bar 28 is partly turned in one direction the bolts 33 will be partly rotated so as to project or retract the locking bolts 37.

Importance is attached to the fact that most of the mechanism in each construction is housed within the trees so that its operation can not be interfered with by accumulation of dirt, ice, etc.

It will be noted that the rocking members 5, 12 and 14, and the corresponding members in the structures shown in Figs. 3 and 4 not only serve to actuate the bolts within the trees but also constitute the sole supports for the trees.

What is claimed is:

1. The combination with a tree having trace engaging bolts slidably mounted within the end portions thereof, and a pivot bolt extending through the tree; of a tree supporting rock bar connected to and extending at an angle from the pivot bolt, means for actuating said bar, and means operated by the bar for actuating the bolts.

2. A device of the class described comprising a tree, elements movably mounted upon the ends thereof, a rock bar extending into the middle portion, and constituting the sole support of the tree, a pivot bolt extending through the tree and connected to the rock bar, oppositely extending arms upon the rock bar, and connections between said arms and the respective movable elements.

3. The combination with a tree and bolts movably mounted in the ends thereof; of a rock bar extending into the middle portion, and constituting the sole support of the tree, a pivotal bolt extending through the tree and connected to the rock bar, oppositely extending arms upon the rock bar, and connections between said arms and the respective bolts.

4. The combination with a tree, and bolts movably mounted in the ends thereof; of a sectional rock bar projecting into the middle portion of the tree, a pivot bolt extending through the tree, a swivel connection between the bolt and the rock bar, a universal joint connecting the sections of the rock bar, and means operated by the movement of the rock bar for simultaneously actuating the bolts.

5. The combination with a swingletree and bolts movably mounted in the ends thereof; of a sectional rock bar, means for actuating the same, a universal joint between said sections, one of said sections projecting into the swingletree, a pivot pin extending through the tree, a swivel connection between said pin and the rock bar, oppositely extending arms within the tree and upon the rock bar, and means for transmitting motion from said arms to the bolts.

6. The combination with a doubletree, a rock bar projecting thereinto and swiveled therein, and means for actuating the rock bar; of swingletrees, bolts movably mounted in the ends thereof, sectional connections between and projecting into the doubletree and swingletrees, means within the doubletree and actuated by the rock bar for simultaneously rocking the sectional connections, and means within the swingletrees and operated by said connections for actuating the bolts.

7. The combination with a rock bar, a doubletree mounted to swing relatively thereto, said rock bar projecting into and being swiveled within the doubletree, and means for actuating the rock bar; of swingletrees, trace engaging devices movably mounted therein, means for movably connecting the doubletree and the swingletrees, mechanism within the doubletree actuated by the rock bar for rocking said means, and mechanism within the swingletrees and actuated by said connections for shifting the trace engaging devices into engaging or non-engaging positions.

In testimony that I claim the foregoing as my own, I have hereto affixed my signature in the presence of two witnesses.

JOHN G. MILLER.

Witnesses:
J. W. BROOKS,
M. C. STELLE.